United States Patent [19]

Schellenbach

[11] Patent Number: 5,447,674
[45] Date of Patent: Sep. 5, 1995

[54] METHOD FOR PRODUCING A GAS-TIGHT PLASTIC CLOSURE FOR CONTAINERS

[76] Inventor: Frank Schellenbach, Tuebinger Allee 22, 7032 Sindlefingen, Germany

[21] Appl. No.: 48,614

[22] Filed: Apr. 14, 1993

Related U.S. Application Data

[63] Continuation-in-part of Ser. No. 715,376, Jun. 14, 1991, abandoned, which is a continuation of Ser. No. 314,066, Feb. 3, 1989, abandoned.

[30] Foreign Application Priority Data

Jun. 4, 1987 [DE] Germany .......................... 37 18 782.1

[51] Int. Cl.[6] ...................... B29C 45/16; B29C 45/10
[52] U.S. Cl. ................................ 264/255; 264/268; 425/130; 425/577; 425/809
[58] Field of Search ............... 264/255, 268, 328.7, 264/266, 267; 425/577, 809, 130

[56] References Cited

U.S. PATENT DOCUMENTS

| | | | |
|---|---|---|---|
| 3,809,733 | 5/1974 | Sandiford et al. | 264/45 |
| 4,004,868 | 1/1977 | Ohdate | 425/130 |
| 4,440,820 | 4/1984 | Shiho et al. | 264/247 |
| 4,676,941 | 6/1987 | Shiho et al. | 264/328.7 |
| 4,681,712 | 7/1987 | Sakakibara et al. | 264/328.7 |
| 4,726,758 | 2/1988 | Sekine | 264/328.7 |
| 4,733,801 | 3/1988 | Scammell | 264/328.7 |
| 4,754,892 | 7/1988 | Retief | 215/329 |
| 4,784,817 | 11/1988 | Towns | 264/328.7 |
| 4,789,236 | 12/1988 | Sorenson | 264/328.7 |
| 4,803,031 | 2/1989 | Ochs | 425/DIG. 5 |
| 4,844,405 | 7/1989 | Sorenson | 425/577 |

FOREIGN PATENT DOCUMENTS

| | | |
|---|---|---|
| 378498 | 8/1985 | Austria . |
| 1280104 | 11/1961 | France . |
| 1503998 | 10/1967 | France . |
| 2454975 | 11/1980 | France . |
| 2572676 | 5/1986 | France . |
| 2593148 | 7/1987 | France . |
| 3703031 | 8/1988 | Germany . |
| 113651 | 9/1979 | Japan . |

Primary Examiner—Jan H. Silbaugh
Assistant Examiner—Angela Ortiz
Attorney, Agent, or Firm—Arnold, White & Durkee

[57] ABSTRACT

A mold core for use in a two-component injection molding method is presented, in particular for two-component injection molding of plastic closures for bottles and similar containers. The invention solves the problem that integral mold cores, due to the configuration of the first molding, are only difficultly or not at all displaceable by a predetermined amount from the first molding, to form an intermediate space or second cavity for the injection of a second molding. The invention accounts for this in that the mold core consists of first and second sub-cores or tool elements and that one sub-core or tool element, after injecting the first substance, is displaceable by a predetermined amount relative to the first molding. After the second substance has been injected into the created intermediate space to form the second molding, a central tool element of the mold core is used as an ejector to support the deforming of the closure from the mold core.

3 Claims, 4 Drawing Sheets

METHOD FOR PRODUCING A GAS-TIGHT PLASTIC CLOSURE FOR CONTAINERS

This application is a continuation-in-part of U.S. patent application Ser. No. 715,376, filed Jun. 14, 1991, abandonned, which is a continuation of U.S. patent application Ser. No. 314,066, filed Feb. 3, 1989, abandoned, which is the U.S. national stage of International Application No. PCT/DE88/00331, filed Jun. 3, 1988, which claimed a priority date based on German Application, Serial No. P 37 18 782.1-16, filed Jun. 4, 1987; the benefit of the earlier filing dates of these applications is claimed under 35 U.S.C. §§ 119 and 120. Applicants co-pending U.S. patent application Ser. No. 07/443,082, filed Nov. 27, 1989, abandoned, which corresponds to German Application, Serial No. DE 37 03 680.7-16, is hereby incorporated by reference and the benefit of the earlier filing dates of those applications is claimed.

FIELD AND BACKGROUND OF THE INVENTION

The invention relates to a method for producing a gas-tight plastic closure for containers by two-component injection molding. Such a method is known from U.S. Pat. No. 4,754,892. Two-component injection molding of such a type is performed in a molding station comprising a concave mold form in a first tool portion and a mold core in a second tool portion. The tool portions create a first cavity and are displaceable with respect to one another at a predetermined separation plane. The known cap is produced by injecting flowable thermal plastic material through a runner into the first cavity. The known runner is located in the mold form tool portion, not in the separation plane between the mold form and the mold core.

The inner core of the known molding device is rotated so as to move downward. The U.S. patent teaches that an excentric pin moves out of the end panel wall leaving a passage. This rotational movement is objected by the cap body and may result in a damage of the cap.

In addition, the known core is fully moved out of the mold form. Thereafter, the cap is ejected from the mold form. This type of deforming and ejecting requires completed rotation of the mold core which is an uneconomically complex and time-consuming movement in mass article production.

U.S. Pat. No. 4,803,031 discloses another two-component injection method for closure caps. In a first injection phase, a lower molding head is illustrated in its raised position with a tight engagement between a plunger and an upper die member in a position defining a sealing member. A softer plastic for the sealing member is injected from a nozzle outlet into the sealing member cavity. Thus, the sealing member is molded as a first component. This nozzle outlet and another nozzle outlet are not in a central position and are not released during the dropping of the plunger. The entire lower die head is lowered and the second nozzle outlet is used to fill the resulting cavity comprising the cover and the skirt portion of the closure cap. Lowering of the lower die head occurs, before the retaining means of the cap body have been molded. Finally, the molding plunger is unscrewed from the closure. There is no support of a final ejection of the plastic closure from the mold core by an axial displacement of a central tool element of the mold core.

In Applicant's co-pending U.S. patent application Ser. No. 07/443,082, protection is sought for a method for producing an airtight plastic closure for bottles and similar containers, in which two-component injection molding is employed.

The method is used in a manner such that the mold form is configured in the form of the actual closure cap, where the interior space of this closure cap is complementarily enclosed by the mold core in the usual manner. According to the method suggested in that application, the mold core is then displaced by a predetermined amount relative to the first molding and the second substance is injected through a central injection feeder into the so created intermediate space. This second substance is usually designed as a sealing member with respect to the bottle to be closed.

The method described in that patent application, which uses two-component injection molding, has great advantages for producing plastic closures for bottles and similar containers, which arise both in the production and also in the later use of such closures.

According to the above-described method, it remains up to the skilled person how he performs the relative movements of the mold core. Since bottle closures usually are provided with retaining means like threadings on the inside, with which they can be screwed onto the bottle to be closed, it would be possible to screw back the mold core by a predetermined amount from the previously molded closure, and then to inject the second substance into the so created intermediate space.

SUMMARY OF THE INVENTION

The invention provides a more efficient possibility, according to which the mold core can be displaced by a predetermined amount from the closure. Later on, the closure can be easily ejected from the mold core.

In accordance with the invention, the mold core consists of first and second sub-cores or tool elements and of an ejector or central tool element having a double function. This division into sub-cores or tool elements opens the possibility of retaining one sub-core or tool element at its position and only displacing the other sub-core or tool element by a predetermined amount. This measure makes it possible, to structure the outer sub-core or tool element so that it represents the mold for the retaining means or threading to be formed on the closure. In such a case, this sub-core or tool element would be held fixed, while the inner sub-core or tool element is drawn back to form the intermediate space for injecting the second substance.

The object of the invention therefore is to design a mold core of the assumed type and to create a plastic closure production method, so that the finished closure is easily handled in practice and can reliably withstand all separation forces arising in the axial direction. This object is solved with a two-component injection molding method according to the invention.

A mold core and a production method in accordance with the invention makes it possible to withdraw the inner sub-core or tool element while the outer sub-core or tool element remains at its original location. In particular, those types of inside and/or outside profiles can be produced which do not allow the movement of a one-part mold core after injecting the first substance, or this only with difficulty. In combination, a central tool element or ejector releases a central injection feeder for concentrical injection of the second component and supports final ejection of the closure cap.

In accordance with the invention, the axial force on a closure cap in use is contained by interior profile elements, which simultaneously provide the force for sealing. Such profile elements could be threadings, ridges or recesses, which are formed on the initially molded closure cap and which hinder the movement of the mold core. The inner sub-core or tool element alone, however, can be easily moved in a purely axial displacement to expose the facing surface of the closure cap for injecting the second molding. The central tool element or ejector also performs a purely axial displacement to serve his double function.

Examples of the more important features of this invention have been broadly outlined in order that the detailed description that follows may be better understood and so that the contributions which this invention provides to the art may be better appreciated. There are, of course, additional features of the invention which will be described herein and which will be included within the subject matter of the claims appended hereto.

DETAILED DESCRIPTION OF THE INVENTION

Additional objects, features and advantages of the present invention will become apparent by referring to the following detailed description of the invention in connection withe the accompanying drawings.

Figure 1:
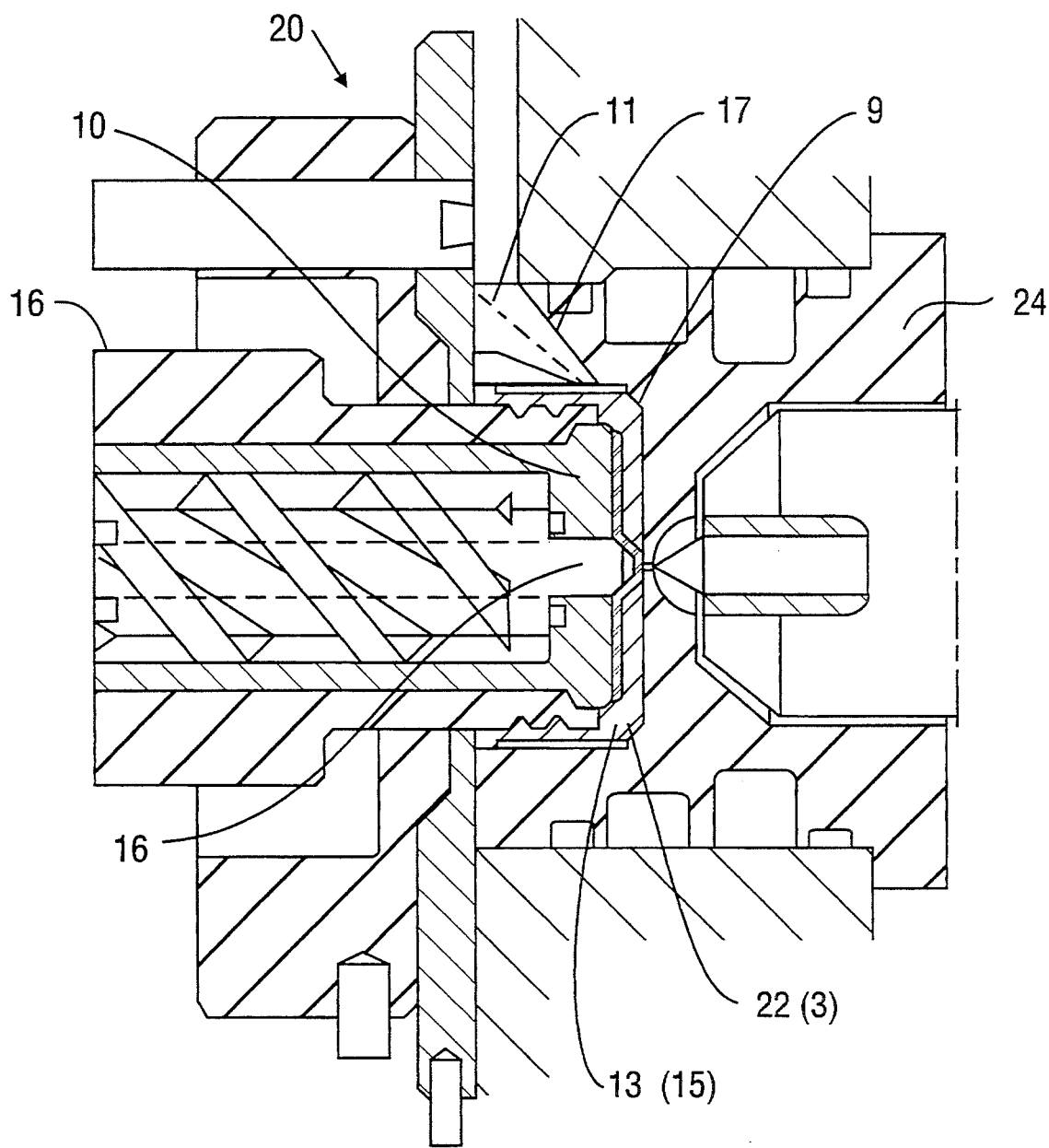
FIG. 1 illustrates a two-component injection molding station for carrying out the method of the invention.

FIG. 1 depicts an injection molding station 20 employing essential features of the invention. The two-component injection molding process is performed in a molding station or molding machine 20 which comprises a concave mold form 9 in a first tool portion 24 and a mold core 10 in a second tool portion 26. The mold core 10 is adjusted in a first phase to create a first cavity 22 which has the form of the cap body 3 of the plastic closure 12. The tool portions 24 and 26 are displaceable with respect to one another. In the embodiment of FIG. 1, the concave mold form 9 belongs to a fixed tool portion 24 and the mold core 10 belongs to a movable tool portion 26. The geometrical separation between the fixed tool portion 24 and the movable tool portion 26 occurs at the so-called separation plane 11.

The two components 3 and 15 of the gas-tight plastic closure 12 are injection-molded without exchanging the molding station 20 or one of the tool portions 24, 26 thereof. Only a predetermined relative separation A of the mold core 10 and the concave mold form 9 occurs for creating a second cavity 13. The relative separation A is thus interpolated between the first injection and the second injection, so that the time consumption of the whole molding process is considerably lowered.

The cap body 3 is molded when the first component is injected through a tunnel section 17. The tunnel section 17 is located in the separation plane 11 of the tool portions 24, 26, so that the first component is injected into the separation plane 11.

In a second phase, a central tool element 16 of the mold core 10 releases a central injection feeder 14 during the predetermined relative separation A of the mold core 10 and the concave mold form 9. A sealing member 15 is molded as a second component by the second injection. The second component is concentrically injected through the cap body 3 and through the central injection feeder 14.

The mold core 10 is composed of tool elements 1, 2 and 16 in concentrical manner. The tool elements 1, 2 and 16 are movable with respect to each other in purely actual displacements. Thus, the predetermined relative separation A for creating the second cavity 14 is not objected by any retaining means or other parts of the cap body 3.

In the subsequent deforming of the plastic closure 12, the mold core elements 1, 2 and 16 carry the molded two-component plastic closure 12, when the movable tool portion 26 is separated from the fixed tool portion 24 by relative displacement at the separation plane 11. In a final ejection step, the gas-tight plastic closure 12 is ejected from the mold core 10, whereby this ejection is supported by an axial displacement of the central tool element 16 of the mold core 10.

Figure 2:
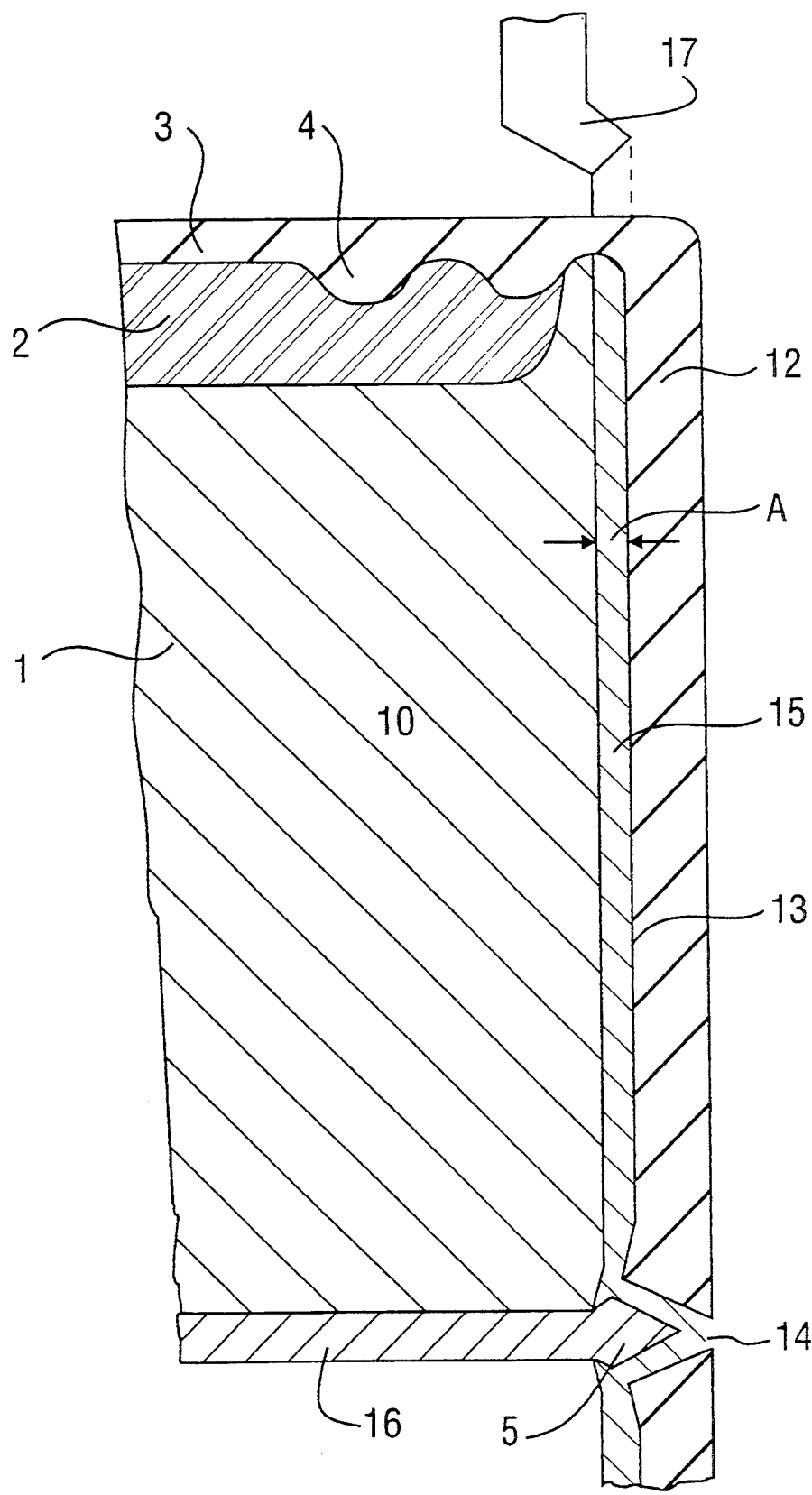
FIG. 2 illustrates a detailed view (axial cross section) on the mold core of the injection molding station of FIG. 1, the mold core having concentrical tool elements in retracted positions in accordance with a first embodiment of the invention.

FIG. 2 shows a quarter cross section of a plastic closure 12 produced according to the invention by two-component injection molding, which however has not yet been formed out of the machine, i.e. has not yet been ejected from the mold core 10 consisting of three concentrical tool elements 1, 2 and 16.

It is to be mentioned that the method known as two-color injection molding has long been introduced in the field, so that this can be considered as being completely known. It is also noted that relevant publications and also more particularly, suitable machines are available on the market in series. The existing knowledge available to the public on two-color injection molding is included by way of reference. The invention resides in the construction of the tools (fixed and movable too portions) which is very specific for each particular article and its production method.

For the purpose of understanding this invention, it is sufficient to consider the following. In the two-component injection molding employed, the machine or molding station is equipped with two injection units as is usual in two-color injection molding. The device has two injection stations, one for pre-injection and one for final injection. An arrangement is used in which one injection unit lies horizontally and injects through a fixed tool plate and the other injection unit is disposed vertically and injects into the tool separation plane between the fixed tool plate and a corresponding movable tool portion.

In the method according to the invention, the closure 12 is produced in a preferred embodiment in which the vertically displaced injection unit injects the first substance of hard polyethylene into the separation plane from the side with respect to the closure axis. This is indicated in FIGS. 1 and 2 by the tunnel section 17.

In the phase of the production of the closure 12 by injection from the side through the tunnel section 17, a mold core 10 serving as a tool portion is adjusted so that a mold form serving as another tool portion is completely filled with the first hard polyethylene substance. With this, the cap body 3 of the closure 12 is made.

Then in the next step, a first tool element 1 of the mold core 10 is drawn back by a certain amount A from the cap body 3 just made, whereby it is principally unimportant whether the mold core 10 or the closure 12 is moved.

The second cavity or intermediate space 13 created between the closure 12 and the mold core 10 is then fully injected with the second soft polyethylene substance. In this embodiment, a central injection feeder 14 is used, which is connected to the injection unit lying horizontally. Theoretically, the feeder for the second substance could be at any suitable position, however the use of the central injection feeder 14 has the effect that the sealing member 15 created by the second injection step is more intimately connected to the closure. This has the advantage that the seal remains connected to the closure even after usage, i.e. after frequent screwing on and off to empty the bottle partially or entirely. Furthermore, an ejector 16 can be used to release the central injection feeder 14.

The employed two-component injection molding makes it possible to match the produced sealing member 15 to the individual bottle to be closed, for example by correspondingly forming the mold core 10. The second substance particularly fills existing corners and curvatures completely.

The relative retraction of the first tool element of the mold core 10 can be made in arbitrary manner. The same can also be done with the closure 12 itself. Important is only that, through a simple linear movement, space is created for inserting the second substance, i.e. while avoiding that tools be pivoted.

Forming out and ejecting the closure 12 finally produced with the sealing member 15 is accomplished by relative displacement of the mold core 10 and the mold form 9, whereby it is essential that the mold core 10 carries the closure 12. Thereafter, an ejector 16, which is a central tool part of the mold core 9, supports the final separation of the closure 12 from the mold core 10. This sequence of deforming is considerably faster than other methods of deforming.

Figure 3:
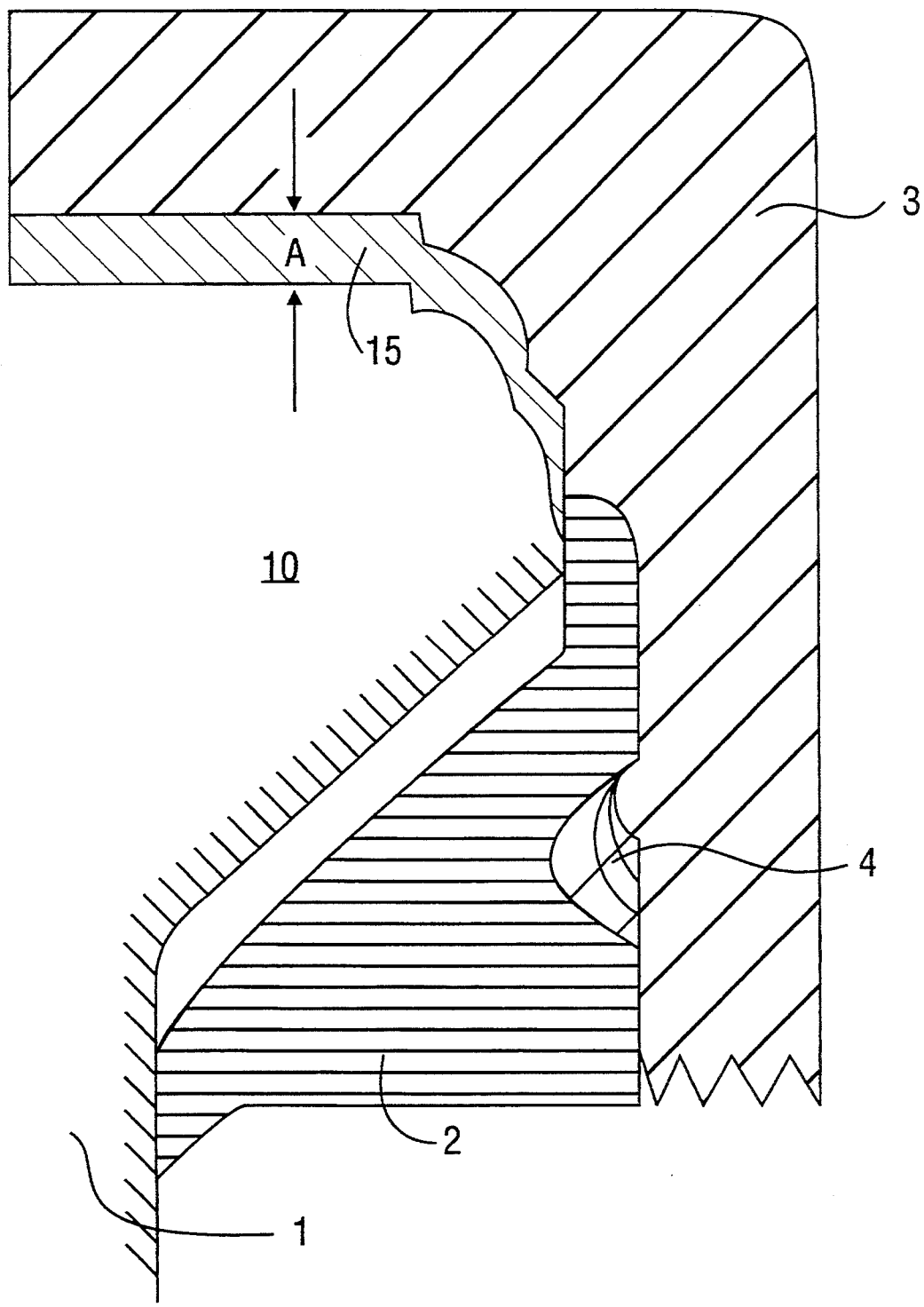
FIG. 3 illustrates an axial cross section of another mold core having two sub-cores or tool elements in a partially retracted position in accordance with a second embodiment of the invention.

FIG. 3 shows an axial cross section of another mold core 10 consisting of a first sub-core or tool element 1 and a second sub-core or tool element 2 and an ejector (not shown). In addition, a molding 3 is shown, i.e. a cap body of a closure for a bottle, which has already been produced by injecting a first substance or first component. This molding 3 comprises a threading 4, which results from a complementary recess in the second sub-core or tool element 2.

The second substance or component 15 is injected after the first sub-core or tool element 1 has been displaced by a predetermined amount A with respect to the molding 3. The distance A is for example 0.7 mm.

The division of the mold core 10 into first and second sub-cores or tool elements makes it possible to also provide the molding 3 e.g. with circular ridges or vertical indentations instead of threadings 4 (or in addition to threadings 4), which would not allow for rotation of the mold core 10 after completion of the molding 3. However, since the second sub-core or tool element 2 remains fixed with respect to the molding 3 during production of the closure 12 and only the first sub-core or tool element 1 is moved axially, the intermediate space 13 required for injecting the second substance 15 can be created, while ridges or the like, present on the molding 3, are not an obstacle.

It is not important for the invention whether the two sub-cores or tool elements are displaced with respect to one another by means of partial or full axial shifting. Decisive is only that the invention provides the desired intermediate space for injecting the second substance by a simple movement, without this being hindered by obstacles on the molding 3.

Figure 4:
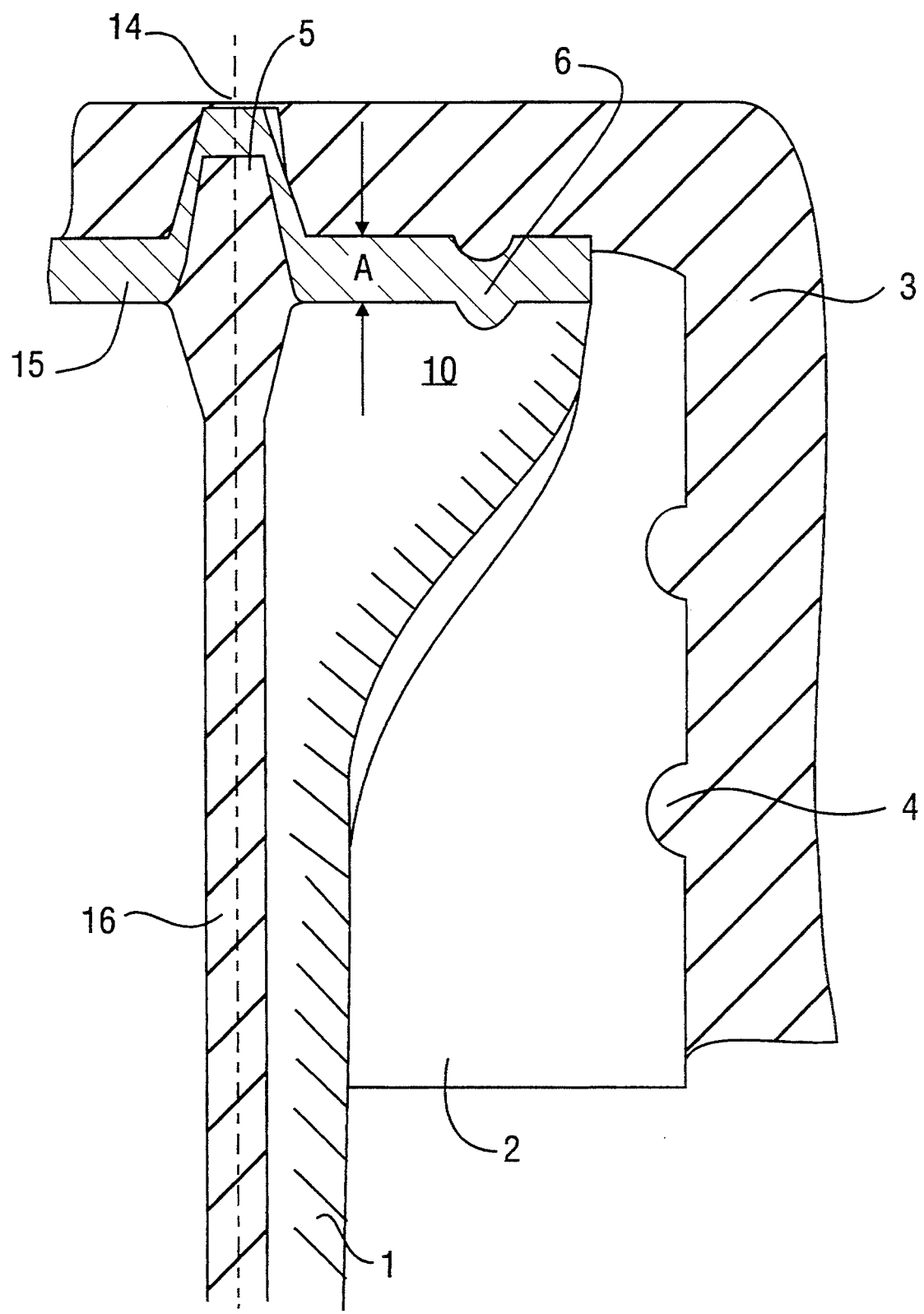
FIG. 4 illustrates an axial cross section of alternative examples of a mold core having two sub-cores or tool elements and a central tool element providing special shapes and special sealing functions in accordance with a third embodiment of the invention.

In yet another embodiment of the invention, the inner sub-core or tool element 1 is provided with profile elements 5 or 6 which serve in forming the second molding 15. Two examples of this are illustrated in FIG. 4.

Reference sign 5 designates a cone of the central tool element 16 projecting into the mold form 9, which provides a small opening in the closure cap when making the first molding 3. After withdrawing the inner sub-core or tool element 1 together with the ejector 16 and its cone 5 and after injecting the sealant 15, a position of relatively small pressure resistance results in the middle. The part corresponding to cone 5, on the one hand, consists of the second softer substance 15, and on the other hand, the closure cap body 3 is weaker in the area around the cone 5 as in the other regions.

Thus a safeguard against bursting can be provided in the closure cap body 3 in a simple manner. With high pressure in the bottle, it cannot happen that the bottle is destroyed or the closure 12 pops off. Moreover, only the middle part corresponding to cone 5 is pushed out of the air-tight closure 12. The high pressure can then be released through the small opening, without a large amount of liquid running out. For example, for a thickness of $A=0.7$ mm, the cone-shaped stopper can withstand an internal pressure of 8 bar. For $A=1$ mm, this limit increases to 10 bar, while for $A=2$ mm it is about 14 bar.

A further example of a useful profile element on the second molding 15 is the sealing bead 6. In the embodiment of FIG. 4, it is provided as a corresponding circular groove 6 on the inside of the sub-core or tool element 1. The circular sealing bead 6 is provided on the axially loaded contact surface of the second molding 15. This profile element 6 serves to adapt the sealing to the form of the bottle neck to be closed. Due to the adapted contact surface, either the allowable gas pressure can be increased or the contact pressure providing the sealing between the closure 12 and the container edge can be decreased. With such profile elements, the skilled person acquires the possibility to adapt the plastic closure produced by the injection method of the present invention to various requirements.

I claim:

1. A method for two-component injection molding of a gas-tight plastic closure cap for a container, comprising:
   (a) nesting a mold core within a mold nest to form a cap-body mold space between an interior surface of the mold nest and the mold core, said mold core comprising:
      (1) an outer subcore, and
      (2) an inner subcore disposed within the outer subcore;
   (b) injecting a first plastic material into the cap-body mold space to form a cap body;

(c) removing the inner subcore from the formed cap body by a sufficient amount to form a sealing-member mold space between the cap body and the inner subcore; and (d) injecting a second plastic material through the cap body into the sealing-member mold space to form:
(1) a sealing member adjacent to the inner surface of the cap body, and
(2) a plug of said second plastic material extending through the cap body, wherein, in conjunction with step (c) of removing the inner subcore from the formed cap body, the outer subcore is removed from the cap body by an amount that, combined with the removal of the inner subcore, results in a relative movement between the inner subcore and the outer subcore.

2. The method of claim 1, wherein the outer subcore is removed from the cap body by a rotational movement.

3. The method of claim 1, wherein the inner subcore is removed from the cap body before the outer subcore is removed from the cap body.

* * * * *